United States Patent
Tung et al.

(10) Patent No.: US 8,868,827 B2
(45) Date of Patent: *Oct. 21, 2014

(54) FIFO APPARATUS FOR THE BOUNDARY OF CLOCK TREES AND METHOD THEREOF

(75) Inventors: Hsu-Jung Tung, Hsinchu (TW); Sen-Huang Tang, Hsinchu (TZ)

(73) Assignee: Realtek Semiconductor Corp. (TW)

( * ) Notice: Subject to any disclaimer, the term of this patent is extended or adjusted under 35 U.S.C. 154(b) by 326 days.

This patent is subject to a terminal disclaimer.

(21) Appl. No.: 13/418,882

(22) Filed: Mar. 13, 2012

(65) Prior Publication Data

US 2012/0239870 A1 Sep. 20, 2012

(30) Foreign Application Priority Data

Mar. 14, 2011 (TW) .............................. 100108606 A (51) Int. Cl.
*G06F 12/00* (2006.01)
*G06F 13/00* (2006.01)
*G06F 13/28* (2006.01)
*G06F 1/00* (2006.01)
*G06F 5/06* (2006.01)
*G06F 1/04* (2006.01)

(52) U.S. Cl.
CPC ... *G06F 5/06* (2013.01); *G06F 1/04* (2013.01)
USPC .......................................... 711/104; 713/501

(58) Field of Classification Search
CPC ...... G06F 12/00; G06F 13/00; G06F 13/1689; G06F 1/04; G06F 1/06
USPC .......................................... 711/104; 713/501
See application file for complete search history.

(56) References Cited

U.S. PATENT DOCUMENTS

| | | | | |
|---|---|---|---|---|
| 5,247,668 A | * | 9/1993 | Smith et al. ................... | 717/154 |
| 5,796,995 A | * | 8/1998 | Nasserbakht et al. ......... | 713/503 |
| 7,187,741 B2 | * | 3/2007 | Pontius et al. ................ | 375/372 |
| 2006/0198237 A1 | * | 9/2006 | Johnson et al. ............... | 365/233 |
| 2010/0223405 A1 | | 9/2010 | Caltagirone et al. | |
| 2010/0238937 A1 | | 9/2010 | Zhou et al. | |

FOREIGN PATENT DOCUMENTS

| TW | 200424848 A | 11/2004 |
|---|---|---|
| TW | 200717519 A | 5/2007 |

OTHER PUBLICATIONS

Office Action issued on Nov. 22, 2013 in corresponding Taiwanese Patent Application No. 10221607890.

* cited by examiner

*Primary Examiner* — Farley Abad
(74) *Attorney, Agent, or Firm* — Volpe and Koenig, P.C.

(57) ABSTRACT

A FIFO apparatus uses a first clock signal in a first clock domain to receive an input signal and uses a second clock signal in a second clock domain to output an output signal. An example apparatus includes: at least three write registers belonging to the first clock domain for receiving the input signal. Each of the write registers has a first output. A first controller belonging to the first clock domain enables the registers, in accordance with an order, to generate an initial signal. A multiplexer receives the first outputs. A second controller belonging to the second clock domain, receives the initial signal through an asynchronous interface and controls the multiplexer to output the first outputs in accordance with the order to be the output signal, wherein the second clock domain is a clock tree generated based on the first clock domain.

16 Claims, 10 Drawing Sheets

FIFO APPARATUS FOR THE BOUNDARY OF CLOCK TREES AND METHOD THEREOF

FIELD OF THE INVENTION

The present invention relates to the design for a first in and first out (FIFO) device, in particular to the design used for the clock tree conversion point with multiple input sources.

BACKGROUND OF THE INVENTION

In digital circuits, clock signals are usually used as a reference for time to define the shifting of data. In order to render every element driven by the clock signals in the circuit being capable of receiving the clock signals, a clock tree is usually generated from one of points of the clock signals or the clock source thereof so as to be used by the elements. However, there is a latency between the clock signals before and after the clock tree generation, which causes the hold time of data requiring corresponding adjustments.

Figure 1:
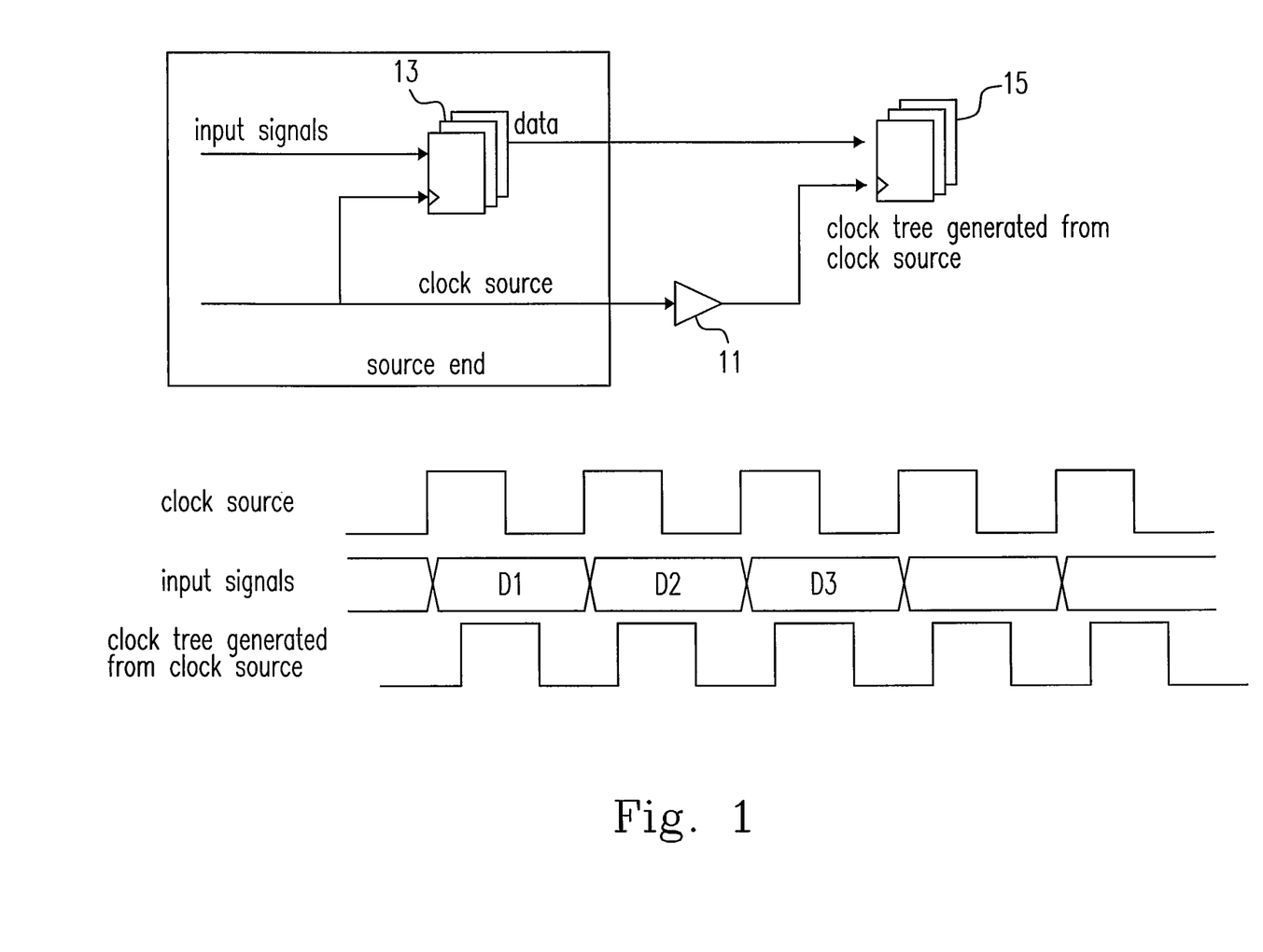
FIG. 1 is a diagram illustrating the latency occurring after generating the clock tree.

FIG. 1 is a diagram illustrating the above-mentioned problem, wherein the buffer or the delay unit 11 is utilized to demonstrate a latency existing between a clock source and the clock tree generated from the clock source. It is noticed that the buffer or the delay unit 11 in FIG. 1 just represents the latency for the clock tree and is not a substantial buffer or latency unit in the design. The source end in FIG. 1 has a register 13 for receiving signals and is driven by the clock source. The data carried in the input signal is transmitted to the register 15 in the back end by the register 13, and the clock tree is generated from the clock source to drive the register 15.

Figure 2:
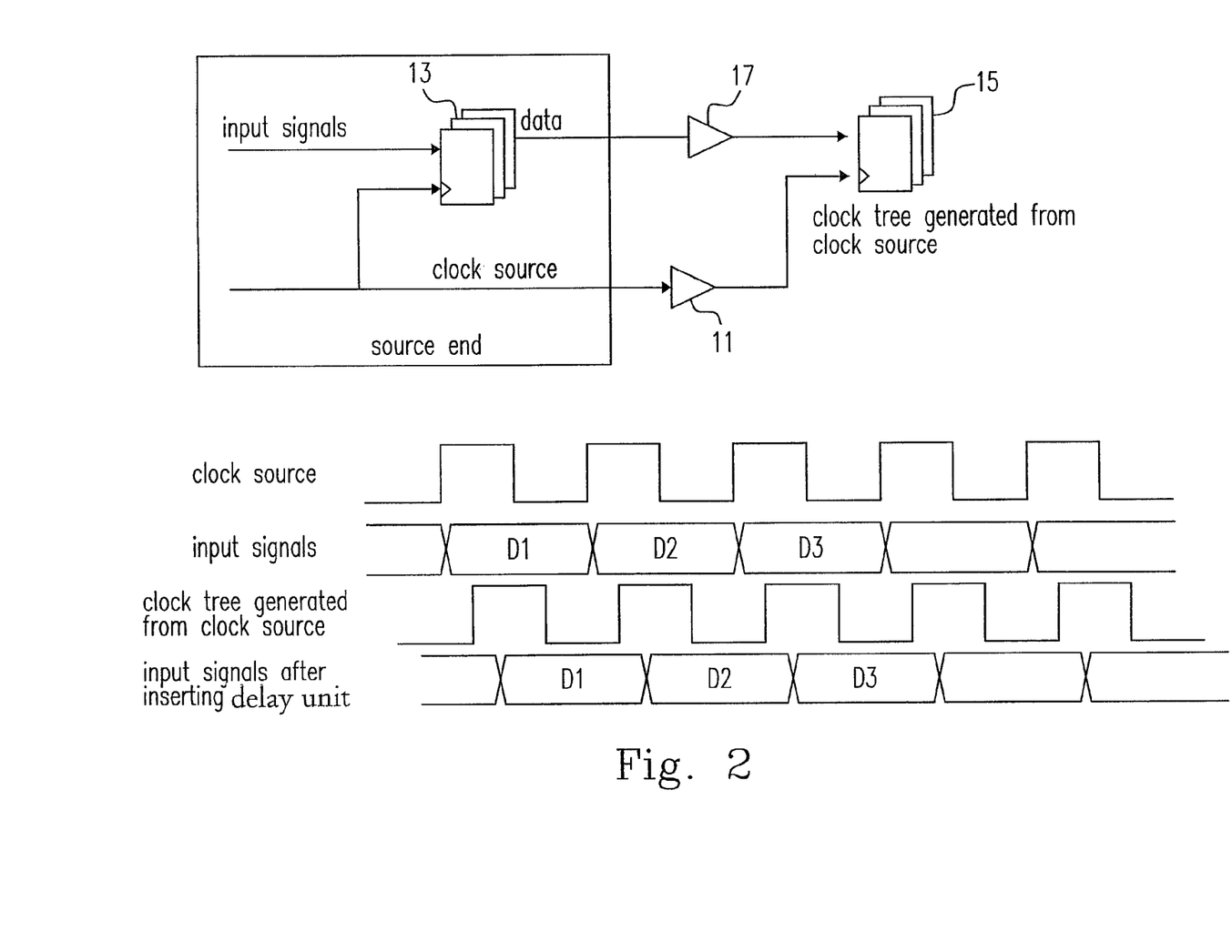
FIG. 2 is a diagram illustrating one of the ways to compensate or balance the latency between the clock and data in prior arts.
Figure 3:
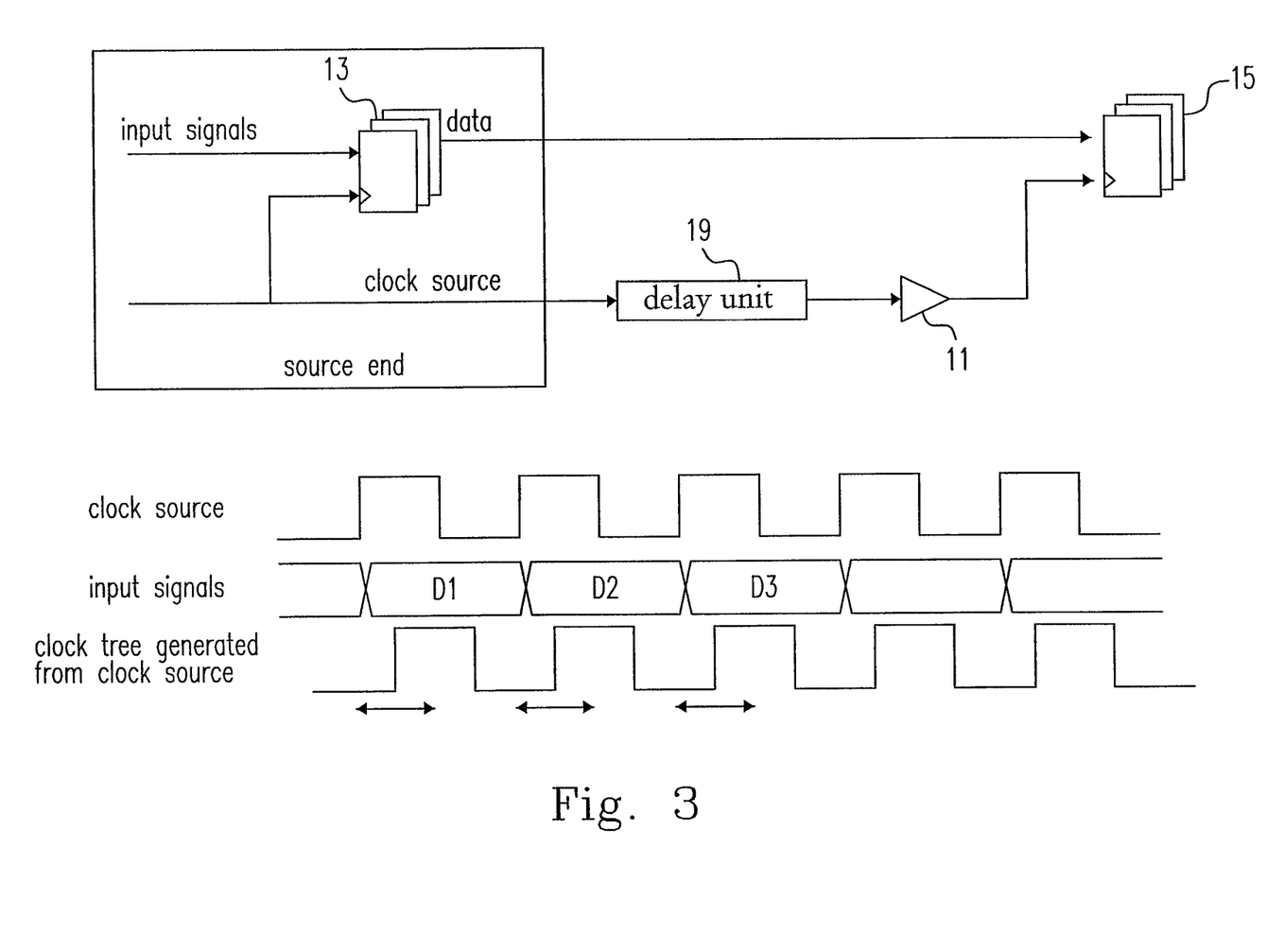
FIG. 3 is a diagram illustrating another way to compensate or balance the latency between the clock and data in prior arts.

In the present invention, an interface where the clock tree is generated by the clock source is termed as a clock tree conversion point. It is shown in the timing sequence diagram of FIG. 1 that the latency between the clock tree and the clock source may cause errors for element 15 when receiving the input data. The latency causes that the input signal transmitted from the clock domain of the source signal to the clock domain of the clock tree fails to be correctly received by element 15. The conventional method utilized to solve the above-mentioned problem is to use the scheme of adding the buffer or the delay unit 17 to render the input data capable of being correctly received by element 15 in timing sequence, as shown in FIG. 2, or the scheme of adjusting the rising or falling edge of the clock tree with a tunable delay unit 19 to trigger the element 15 at the correct timing sequence so as to receive the input data correctly, as shown in FIG. 3.

Though the above-mentioned concept for solving the above problem is simple, it's difficult to implement the practical circuit. Because with the increasing complexity and functionality of the input signals and back end circuits, the clock latency for balancing and compensating caused by the clock tree becomes more and more significant, which causes the above-mentioned scheme extremely complicated and impractical.

Figure 4:
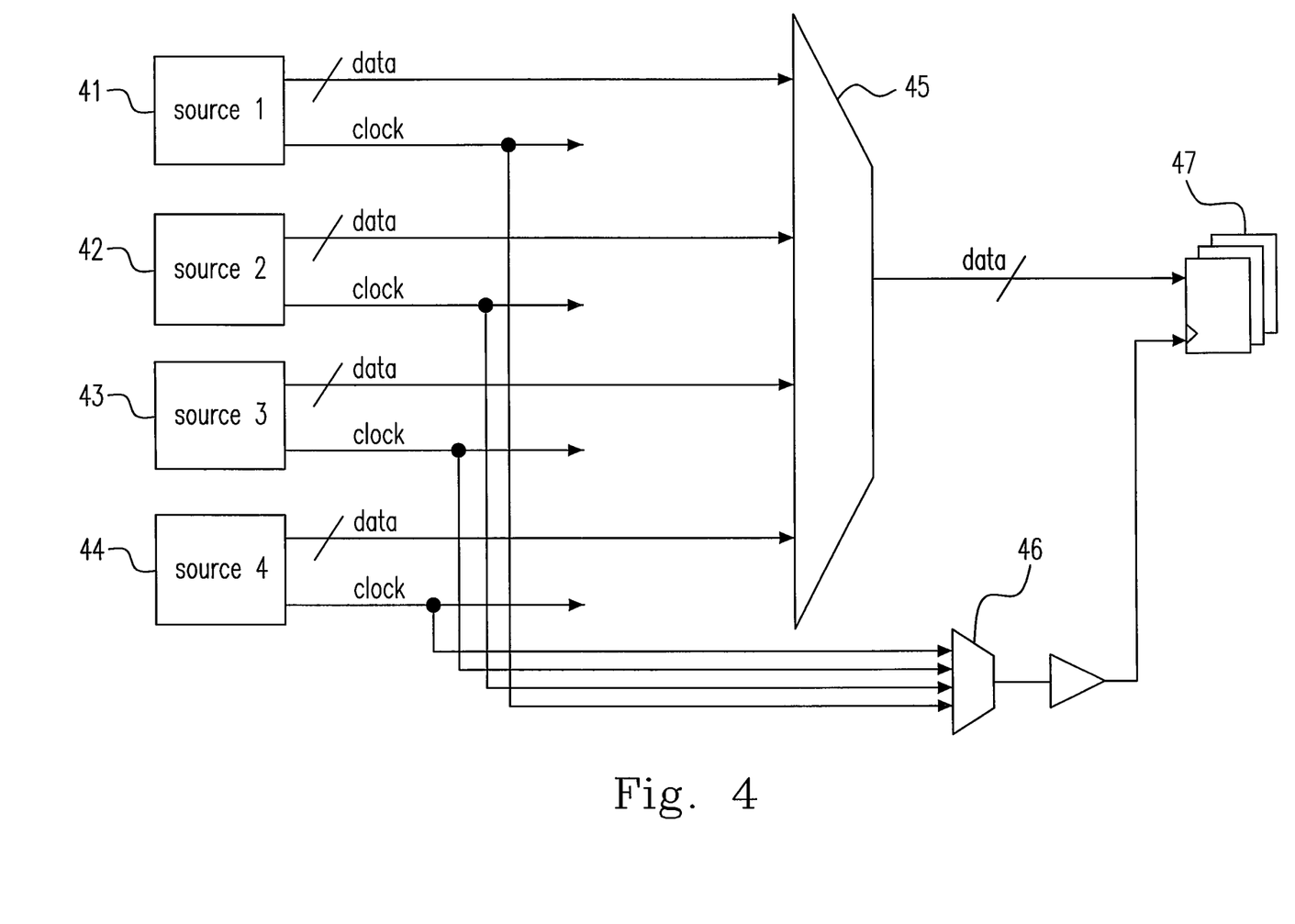
FIG. 4 is a diagram illustrating the clock sources and clock trees under the condition of multiple input sources.

For example, as shown in FIG. 4, there are various input sources such as HDMI, Tuner, component, S, composite, and ADC input, etc. to be inputted into a display. The input sources 41~44 in FIG. 4 have each own clock source respectively, which may range from 13.5 MHz to 300 MHz or even wider, making the balancing and compensating of the clock trees generated after multiplexer 46 with the data from various input sources extremely difficult.

Furthermore, the latency relationship between the clock and data for all the input sources must be constantly adjusted so as to balance the latency relationship between the clock and data to ensure that the first stage of the back end circuit can safely receive all kinds of data by register 47 from multiplexor 45. Since those balanced relationship must be re-adjusted once a new design, input source, floorplan, or layout is added or implemented, which is quite complicated to be implemented for the sake of complexity, time, and cost.

The applicant developed the present application to overcome the above shortcomings, and the brief illustration of the present application is as follows.

SUMMARY OF THE INVENTION

Therefore, one of the purposes of the invention is to isolate the clock source existing before the clock tree is generated and the clock signal existing after the clock tree is generated, so as to solve the problems in prior arts. Another purpose of the invention is to ease the timing constraint problem of multiple input sources with different frequencies.

In accordance with one embodiment of the invention, a first in and first out (FIFO) apparatus is disclosed, which utilizes a first clock signal of a first clock domain to receive an input signal and a second clock signal of a second clock domain to output an output signal, wherein the apparatus includes: at least three write registers belonging to the first clock domain to receive the input signal, wherein each write register has a first input; a first controller belong to the first clock domain for enabling the at least three write registers in accordance with a sequence, and generating an initial signal; a multiplexer for receiving the first outputs; and a second controller belonging to the second clock domain, receiving the initial signal through an asynchronous interface, and controlling the multiplexer to output the first outputs as the output signal in accordance with the sequence in accordance with the initial signal; wherein the second clock domain is based on a clock tree generated from the first clock domain.

Other objects, advantages and efficacy of the present invention will be described in detail below taken from the preferred embodiments with reference to the accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purposes of illustration and description only; it is not intended to be exhaustive or to be limited to the precise form disclosed.

Figure 5:
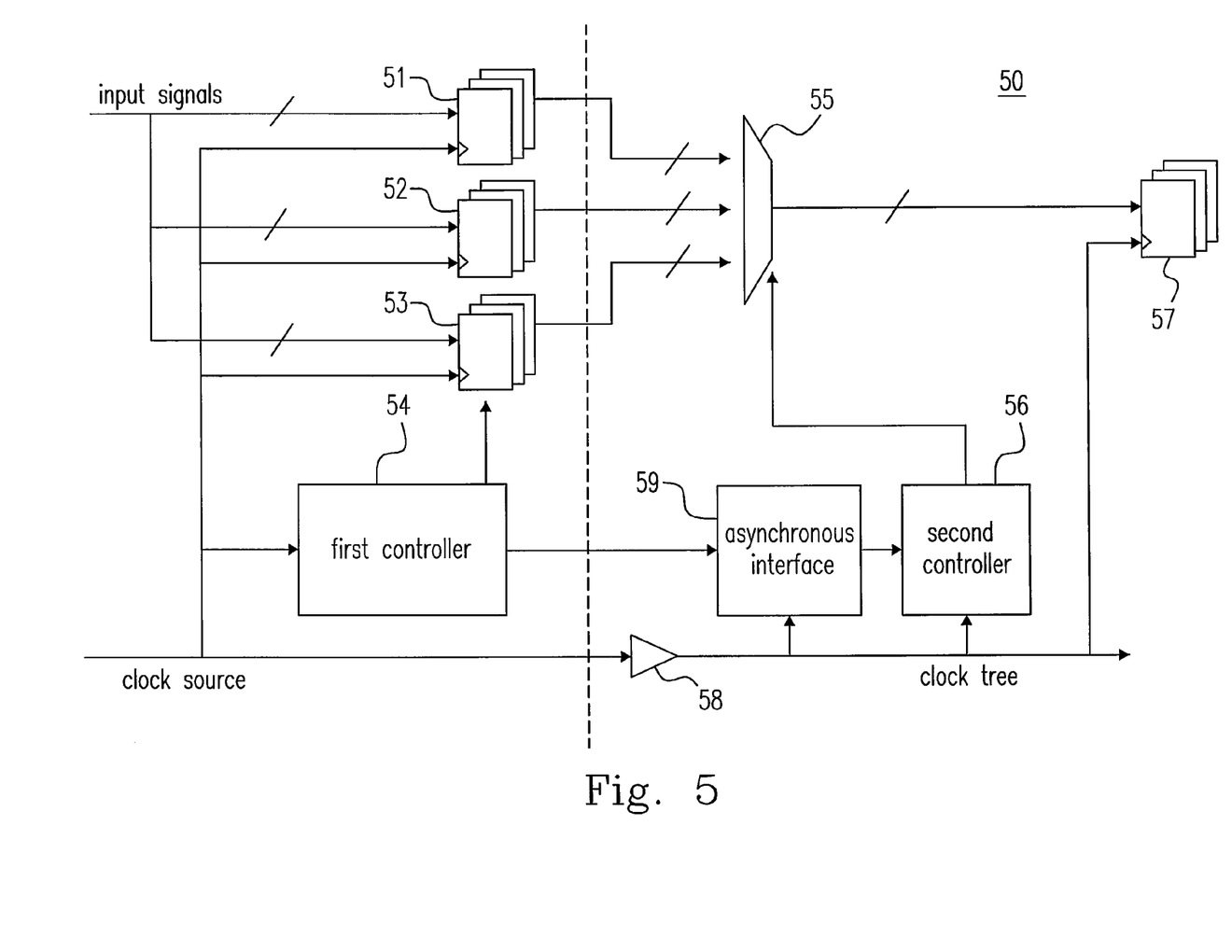
FIG. 5 is a diagram illustrating a first embodiment in accordance with the present invention.

FIG. 5 shows a first embodiment of the first-in and first-out (FIFO) apparatus in accordance with the present invention. In the first embodiment, the FIFO apparatus 50 includes write registers 51~53, the first controller 54, the multiplexer 55, the second controller 56, the output register 57, the latency unit 58 and the asynchronous interface 59. The delay unit 58 represents the latency occurring when the clock source generates the clock tree and is not a substantial element or component. In the present invention, it is assumed that the clock signals between the clock source and the clock tree is not synchronized with each other and there is a phase difference existing therebetween, no matter they may be of the same frequency. Write registers 51~53 and the first controller 54 are driven by the clock source, and are deemed as belonging to a first clock domain. The second controller 56 and the output register 57 are driven by the clock signal of the clock tree, and are deemed as belonging to the second clock domain.

Figure 6:
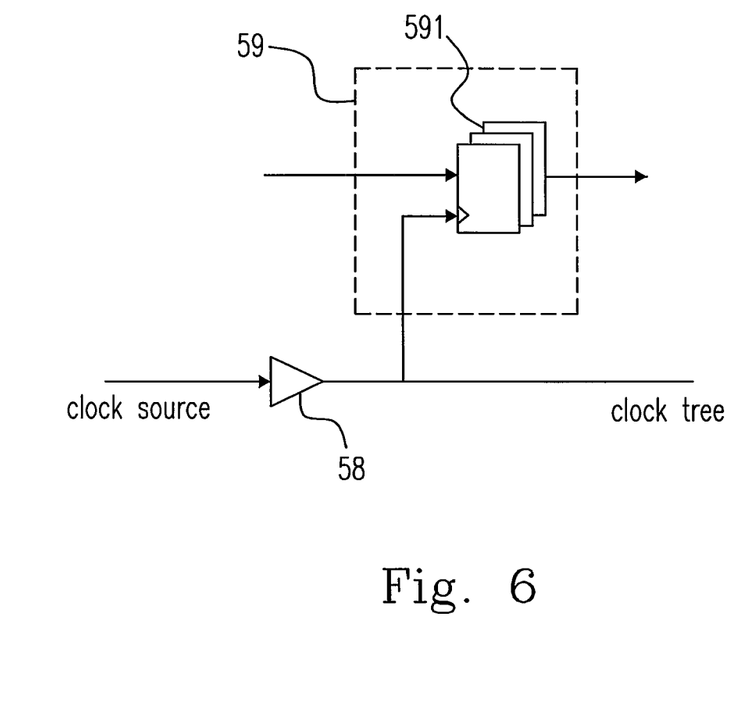
FIG. 6 is a diagram illustrating the structure of the asynchronous interface used in the present invention.

Write registers 51~53 receive a input signal, wherein the input signal is data of a single bit or multiple bits, and each write registers 51~53 have a first output and is electrically connected to the input end of the multiplexer 55. The first controller 54 is electrically connected to registers 51~53 and controls the data contained in the input signal writing into the registers 51~53 in sequence. The first controller 54 generates an initial signal and transmits the initial signal to the second controller 56, wherein the initial signal represents that the first controller 54 gets started working. Since the first controller 54 and the second controller 56 belong to different clock domains, the second controller 56 receives the initial signal via the asynchronous interface 59, and controls the multiplexer 55 to output the respective first inputs in the sequence as the second output at the output end of the multiplexer 55 after receiving the initial signal. Then the second output is received by the register 57. The registers 51~53 and the output register 57 are preferably composed of a D type flip-flop. There is preferably a first counter and a second counter disposed in the first controller 54 and the second controller 56 where the first counter and the second counter counts preferably in accordance with the sequence for enabling the first controller 54 and the second controller 56 deciding the sequence of writing into the write registers 51~53 in accordance with the value counted by the first and second counters. The second counter begins counting in the sequence after the second controller 56 receives the initial signal. The asynchronous interface 59 preferably comprises a D type flip-flop 591 as shown in FIG. 6.

Figure 7:
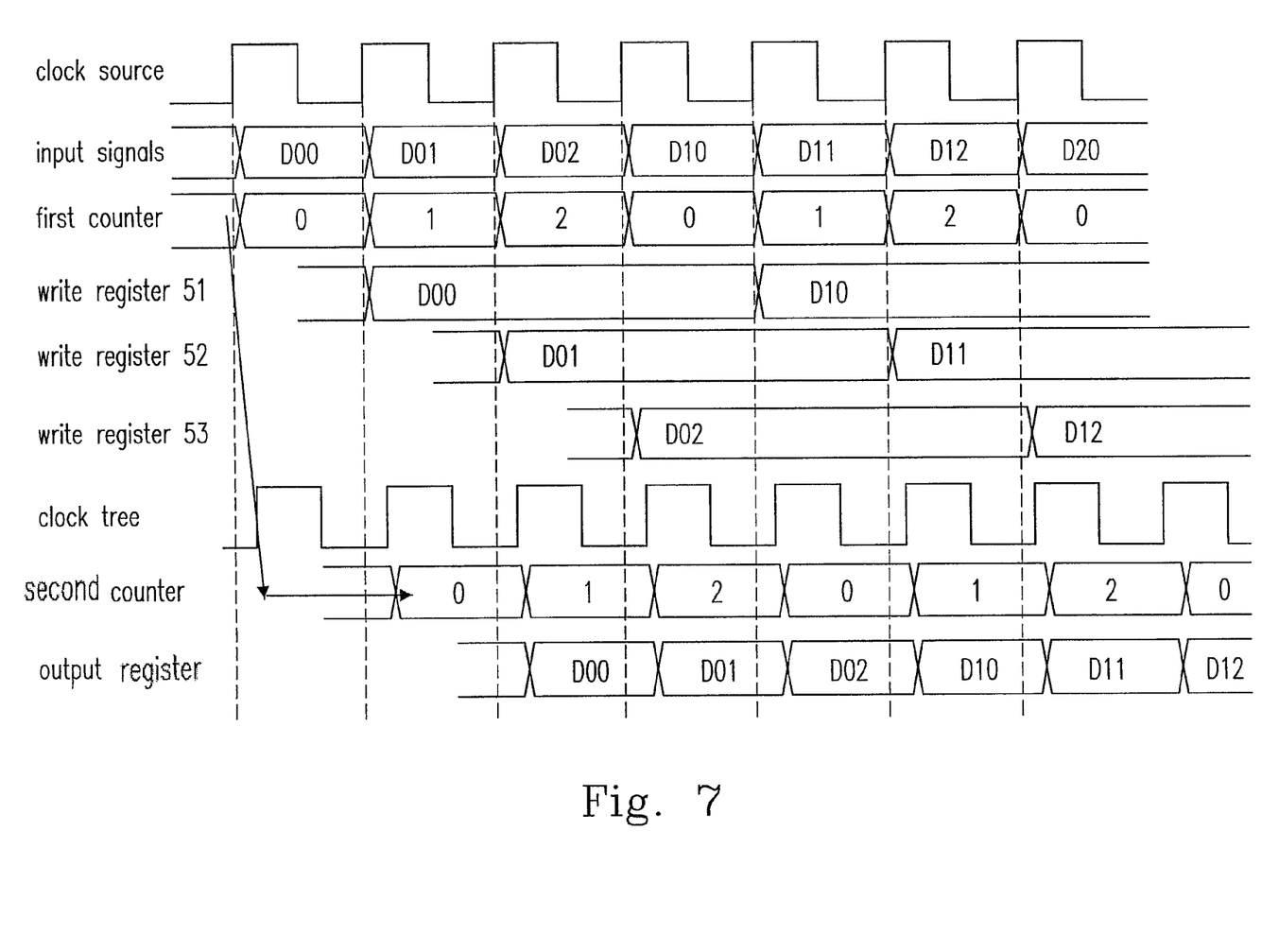
FIG. 7 is a timing sequence diagram of FIG. 5.
Figure 8:
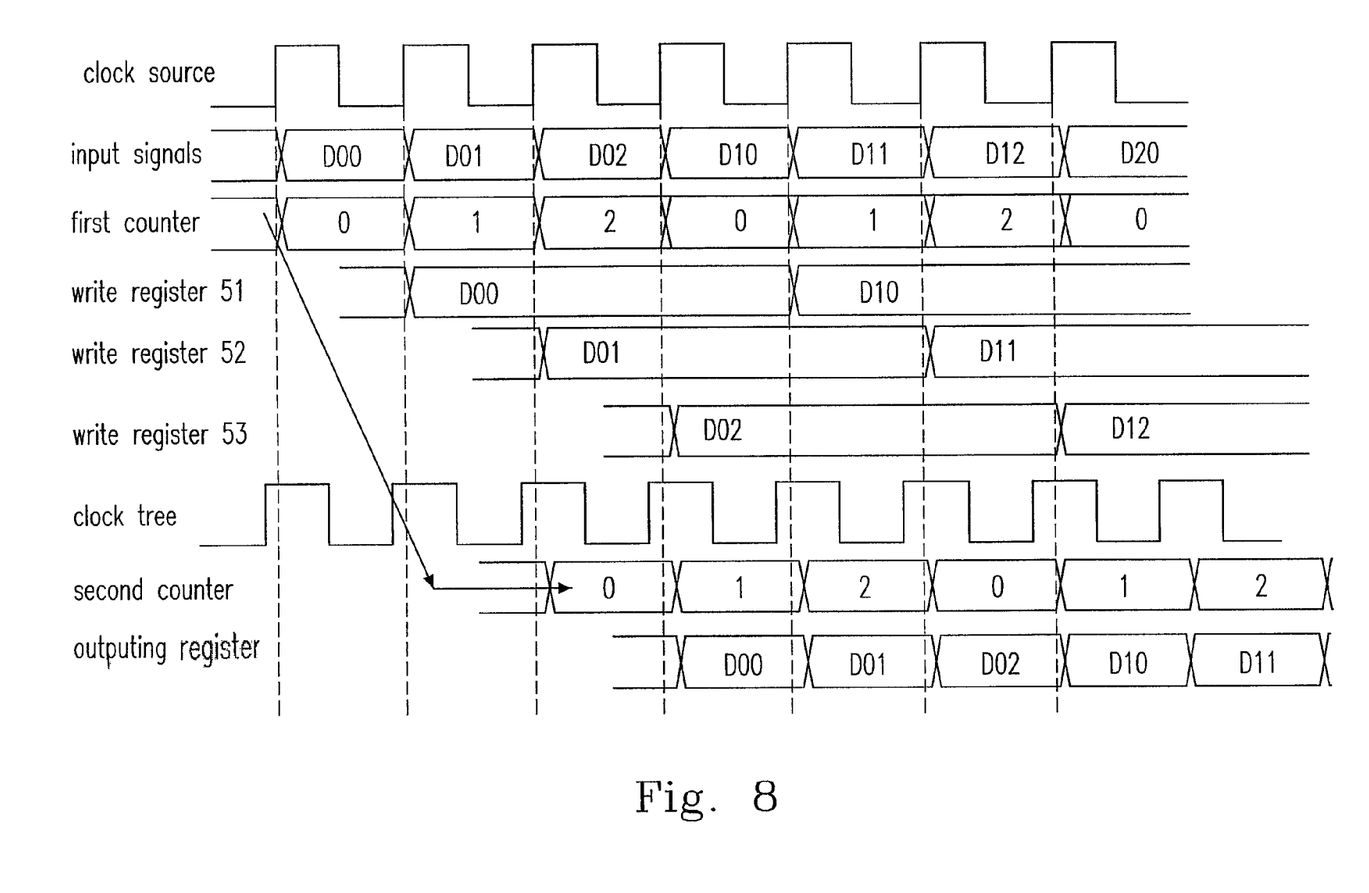
FIG. 8 is a timing sequence diagram of FIG. 5.

The timing sequence diagrams illustrating the FIFO apparatus 50 under two extreme conditions are shown as FIG. 7 and FIG. 8. The clock signal of the clock tree in FIG. 7 slight lags from the clock source. Under the condition that the asynchronous interface 59 comprises a first stage D type flip-flop, the second counter can be regulated to lag from the first counter in two output clock cycles by controlling the transmission of the initial signal, rendering the second counter actually lags from the first counter more than one clock cycle. As shown in FIG. 7, where the arrow is indicated is where the second counter begins counting after receiving the initial signal. Due to the three stage registers 51~53, the output register 57 can correctly access the data stored in registers 51~53.

The clock tree in FIG. 8 is slight ahead of the clock source or the clock tree lags the clock source by nearly a clock cycle; however, as aforementioned, the second counter actually lags from the first counter in approximately two clock cycles. Under such a design, it is concluded from the timing sequence diagram and FIG. 5 that the output register 57 can still correctly access the data of the three write registers 51~53.

Under the above two extreme conditions, the output register 57 can correctly access the data of three write registers 51~53. Therefore, the design of the present invention can ensure the safe receipt for the data.

The numbers of the write registers are never limited to three in the present invention. With more write registers used, the back end circuit can receive data more correctly.

Figure 9:
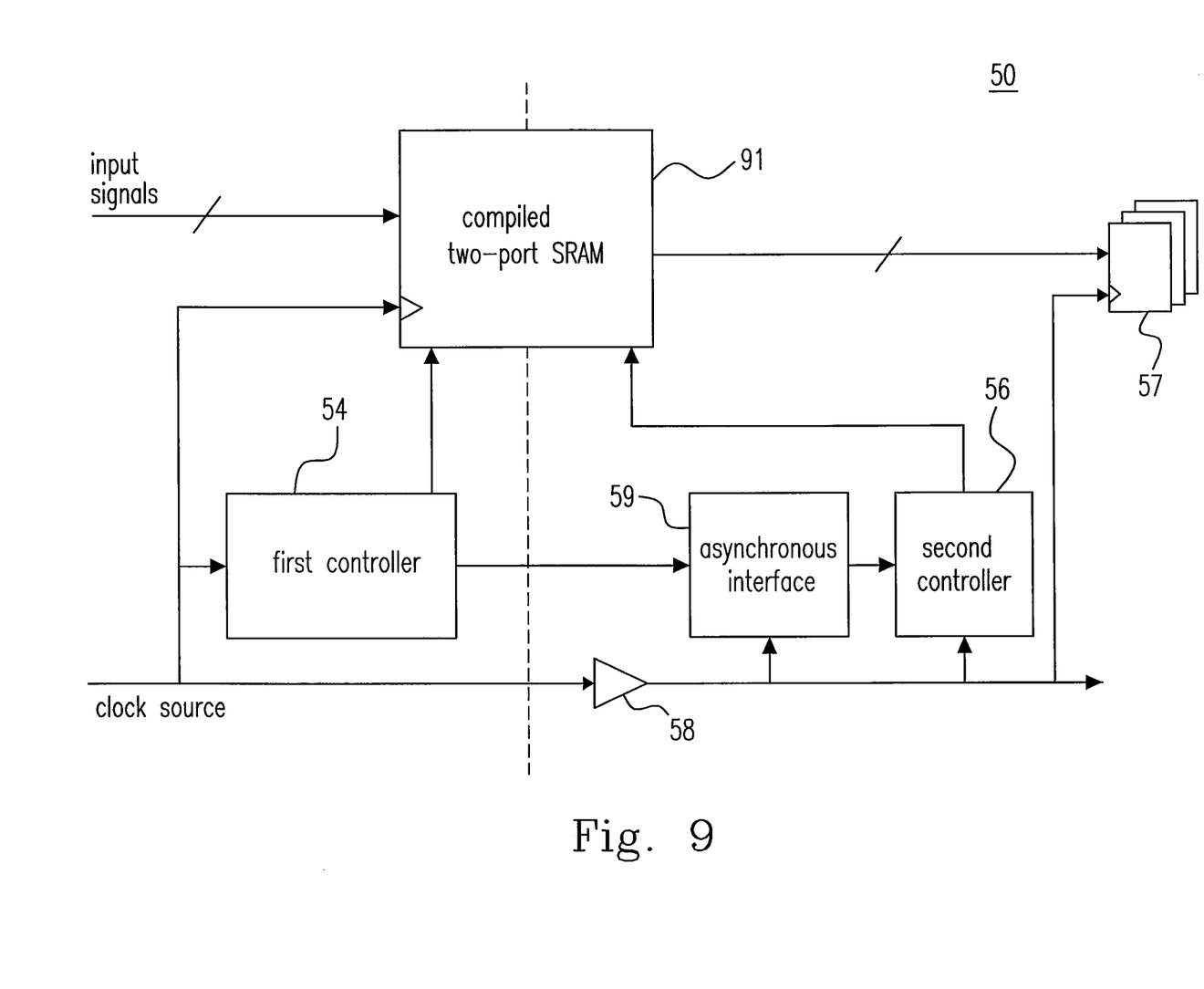
FIG. 9 is a diagram illustrating a second embodiment in accordance with the present invention.

FIG. 9 shows a second embodiment in accordance with the present invention, wherein the write registers 51~53 in previous FIG. 5 are replaced by the compiled 2-port SRAM 91. The first controller 54 can write the data of the input source into three addresses of the 2-port SRASM 91 in accordance with a sequence, and generate an initial signal which is transmitted to the second controller 56 via the asynchronous interface 59 to enable the second controller 56 to start making the SRAM 91 output the data of the input source from the three addresses in accordance with the previous writing sequence as the output signal. The operations for the remaining elements are the same with those in FIG. 5.

One skilled in the art can also realize that the numbers of the write registers are never limited to three in the present invention. With more write registers used, the back end circuit can receive data more correct.

Figure 10:
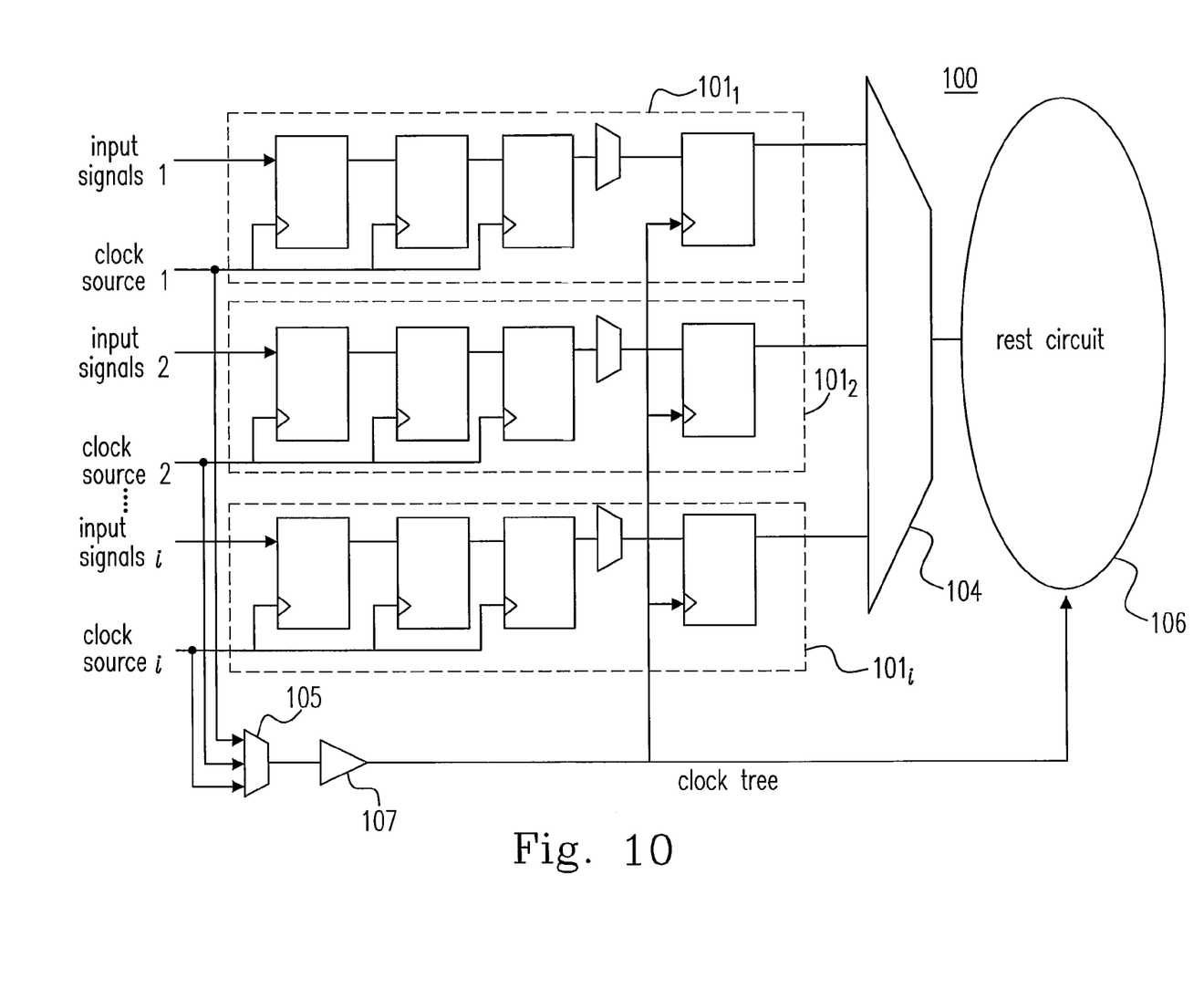
FIG. 10 is a diagram illustrating a third embodiment in accordance with the present invention.

It is concluded from the above-mentioned embodiment that under the single input signal condition, the present invention can ensure the back end circuit correctly receiving data, and solve the issues regarding the complicated procedures for compensating or balancing the latency between clocks and data in prior arts. By the same token, under the multiple input signals condition, the present invention can also be applied by adding the FIFO apparatus as that in FIG. 5 into the respective input sources. FIG. 10 shows the FIFO apparatus 100 which is across two clock domains, wherein the clock domain of the back end is generated from the clock source of the front end via a clock tree.

FIG. 10 includes FIFO circuits $101_1$~$101_i$, the first multiplexor 104, the second multiplexor 105, the rest circuit 106 using the clock tree as clock signal, and the delay unit 107. The latency unit 107 represents that the clock tree is asynchronous with each one of clock sources 1~i or there is phase difference existing therebetween and is not a substantial element, wherein the FIFO circuits $101_1$~$101_i$ are the simplified schematic diagrams of the FIFO apparatus 50 in FIG. 5. The input signals 1~i in FIG. 10 are transmitted to the first multiplexer 104 through FIFO circuits $101_1$~$101_i$ respectively, and then one of the input signals 1~i is selected by the first multiplexer 104 on demand and is transmitted to the rest circuit 106. The second multiplexer 105 selects one of the corresponding clock sources 1~i in accordance with the selected input signal. Each clock sources have frequency ranged from 13.5 MHz~300 MHz or a larger range.

As indicated in the above embodiment, the latency occurring in each input signal can be respectively resolved, and thus the problem that various input sources have different latencies or have a lot of clock frequency differences can be well resolved. Since the circuit of the present invention is not complicated, and only requires balancing the relative relationship between clock and data locally without taking care of the back end circuit. And the clock trees in the back end circuit can be more freely generated without considering the multiple input signals and clocks for balancing or compensating.

The present invention further discloses a method of first in and first out (FIFO), utilizing a first clock signal of a first clock domain to receive an input signal, and utilizing a second clock signal of a second clock domain to output an output signal, the method includes the following steps: basing on the first clock signal and utilizing at least three write registers to receive the input signal, wherein each write register has a first input; Basing on the first clock signal to enable the at least three write regist3rs in accordance with a sequence and generating an initial signal; and basing on the second clock signal and utilizing the initial signal to output the first signals as the output signal in accordance with the sequence; wherein the second clock domain is based on a clock tree generated from the first clock domain, and the second clock domain is not synchronous with the first clock signal.

However, the above mentioned contents are merely the preferably embodiments, and can not limit the scope for implementing. That is to say, any variations or modifications in accordance with the claims of the present invention should belong to the claimed scope of the present invention.

While the invention has been described in terms of what is presently considered to be the most practical and preferred embodiments, it is to be understood that the invention needs not be limited to the disclosed embodiments. Therefore, it is intended to cover various modifications and similar configuration included within the spirit and scope of the appended claims, which are to be accorded with the broadest interpretation so as to encompass all such modifications and similar structures.

What is claimed is:

1. A first in and first out (FIFO) apparatus, utilizing a first clock signal of a first clock domain to receive an input signal, and utilizing a second clock signal of a second clock domain to output an output signal, wherein the apparatus comprises:
   at least three write registers, in the first clock domain, for receiving the input signal, wherein each write register has a first input;
   a first controller, in the first clock domain, for enabling the at least three write registers in accordance with a sequence and generating an initial signal;
   a multiplexer for receiving the first outputs; and
   a second controller, in the second clock domain, for receiving the initial signal through an asynchronous interface and controlling the multiplexer to output the first outputs as the output signal in accordance with the sequence according to the initial signal;
   wherein the second clock domain is based on a clock tree generated according to the first clock domain.

2. The apparatus in accordance with claim 1, wherein the first clock signal is selected from a plurality of clock sources, and the frequencies of the fastest one and the slowest one of the plurality of clock sources differ by at least a magnitude.

3. The apparatus in accordance with claim 2, wherein the input signal is selected from a plurality of source input signals, and the input signal corresponds to the first clock signal.

4. The apparatus in accordance with claim 1, wherein each of the at least three write registers is a D type flip-flop.

5. The apparatus in accordance with claim 1, wherein the first controller comprises a first counter, and the first counter is triggered according to the first clock signal and counts in accordance with the sequence to make the first controller enable the at least three write registers.

6. The apparatus in accordance with claim 5, wherein the second controller comprises a second counter, and the second counter is triggered by the second clock signal and counts in accordance with the sequence to make the second controller output the first outputs as the output signal.

7. The apparatus in accordance with claim 6, wherein the asynchronous interface makes the second counter sequentially behind the first counter by controlling the transmission of the initial signal.

8. The apparatus in accordance with claim 1, wherein the asynchronous interface comprises:
   a D type flip-flop, in the second clock domain for receiving the initial signal, and having an output end to transmit the initial signal to the second controller.

9. A method of first in and first out (FIFO), utilizing a first clock signal of a first clock domain to receive an input signal, and utilizing a second clock signal of a second clock domain to output an output signal, the method comprises the following steps:
   utilizing at least three write registers to receive the input signal according to the first clock signal, wherein each write register has a first input;
   enabling the at least three write registers in accordance with a sequence and generating an initial signal according to the first clock signal; and
   utilizing the initial signal to output the first signals as the output signal in accordance with the sequence according to the second clock signal;
   wherein the second clock domain is based on a clock tree generated according to the first clock domain.

10. The method in accordance with claim 9, wherein the first clock signal is selected from a plurality of clock sources, and the frequency of the fastest one of the plurality of clock sources is higher than the slowest one by at least 5 times.

11. The method in accordance with claim 10, wherein the input signal is selected from a plurality of source input signals, and the input signal corresponds to the first clock signal.

12. The method in accordance with claim 9, further comprising the following step:
   counting in accordance with the sequence according to the first clock signal, to enable the at least three write registers in accordance with the sequence.

13. The method in accordance with claim 10, further comprising the following step:
   receiving the initial signal through an asynchronous interface according to the second clock signal, and outputting the first outputs as the output signal in accordance with the initial signal.

14. A first in and first out (FIFO) apparatus, utilizing a first clock signal of a first clock domain to receive an input signal, and utilizing a second clock signal of a second clock domain to output an output signal, wherein the apparatus comprises:
   a static random access memory (SRAM), in the first clock domain, having at least three addresses for receiving the input signal; and
   a first controller, in the first clock domain, for generating an initial signal, and writing the input signal to the at least three addresses in accordance with a sequence; and
   a second controller, in the second clock domain, for receiving the initial signal through an asynchronous interface and controlling the SRAM to output the input signal as the output signal from the at least three addresses in accordance with the sequence according to the initial signal;
   wherein the second clock domain is based on a clock tree generated from the first clock domain.

15. The apparatus in accordance with claim 14, wherein the first clock signal is selected from a plurality of clock sources, and the frequencies of the fastest one and the slowest one of the plurality of clock sources differ by at least a magnitude.

16. The apparatus in accordance with claim 15, wherein the input signal is selected from a plurality of source input signals, and the input signal corresponds to the first clock signal.

* * * * *